United States Patent
Yee et al.

(10) Patent No.: US 7,835,693 B2
(45) Date of Patent: Nov. 16, 2010

(54) PROVIDING SERVICE IN A SATELLITE COMMUNICATIONS SYSTEM TO DISADVANTAGED TERMINALS

(75) Inventors: David Moon Yee, Scottsdale, AZ (US); Gerard Anthony Smorowski, Jr., Gilbert, AZ (US); Taul Eric Aragaki, Scottsdale, AZ (US); Mark Lawrence Wormley, Scottsdale, AZ (US); James Lynn Warthman, Phoenix, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 604 days.

(21) Appl. No.: 11/933,637

(22) Filed: Nov. 1, 2007

(65) Prior Publication Data

US 2010/0039983 A1   Feb. 18, 2010

(51) Int. Cl.
  *H04B 7/185* (2006.01)
(52) U.S. Cl. ............... 455/12.1; 455/427; 455/450; 455/451; 370/316; 370/329
(58) Field of Classification Search ............ 455/12.1, 455/13.2, 11.1, 427, 429, 430, 512, 517, 455/431, 428, 403, 410, 411, 422, 450, 436, 455/439; 370/316, 329, 466, 522, 310.1, 370/325, 347, 321, 437; 709/217, 219
See application file for complete search history.

(56) References Cited

U.S. PATENT DOCUMENTS

| | | | |
|---|---|---|---|
| 5,392,450 A * | 2/1995 | Nossen .................... 455/12.1 |
| 6,044,070 A * | 3/2000 | Valentine et al. ............ 370/316 |
| 6,253,079 B1 * | 6/2001 | Valentine et al. ............ 455/428 |
| 6,381,228 B1 | 4/2002 | Prieto, Jr. et al. |
| 6,411,806 B1 * | 6/2002 | Garner et al. ............... 455/428 |
| 6,449,267 B1 * | 9/2002 | Connors .................... 370/347 |
| 6,621,801 B1 | 9/2003 | Wright et al. |
| 6,625,129 B1 | 9/2003 | Olds et al. |
| 6,697,850 B1 * | 2/2004 | Saunders ................... 709/219 |
| 7,107,050 B2 * | 9/2006 | Combes et al. ............. 455/427 |
| 2002/0160777 A1 * | 10/2002 | Takao et al. ................ 455/436 |
| 2003/0236854 A1 * | 12/2003 | Rom et al. .................. 709/217 |
| 2005/0009467 A1 * | 1/2005 | Nuber ....................... 455/12.1 |
| 2007/0099562 A1 * | 5/2007 | Karabinis et al. .......... 455/12.1 |
| 2009/0109895 A1 * | 4/2009 | Kota et al. .................. 370/316 |

* cited by examiner

*Primary Examiner*—Tan Trinh
(74) *Attorney, Agent, or Firm*—Meschkow & Gresham, P.L.C.

(57) ABSTRACT

A base station (26) provides service in a satellite communications (SATCOM) system (22) to a terminal (24). The SATCOM system (22) operates in accordance with a first standard (43), and the terminal (24) is unable to communicate in accordance with the first standard (43). Methodology entails receiving, at a SATCOM resource controller (32), a request (62) for a satellite resource (46) from the base station (26). The satellite resource (46) is allocated to the base station (26) and the controller (32) sends a message (58) with the allocated satellite resource (46). The base station (26) applies a second standard (48), defining a specific set of functional and performance characteristics, to the satellite resource (46). The terminal (24) is enabled to perform satellite communications in accordance with the second standard (48) using the satellite resource (46).

20 Claims, 6 Drawing Sheets

FIG. 1

PROVIDING SERVICE IN A SATELLITE COMMUNICATIONS SYSTEM TO DISADVANTAGED TERMINALS

TECHNICAL FIELD OF THE INVENTION

The present invention relates to the field of satellite communications. More specifically, the present invention relates to providing service in a satellite communications system to terminals that would otherwise be unable to communicate via the satellite communications system.

BACKGROUND OF THE INVENTION

Satellite communications (SATCOM) systems or networks enable communication at very long distances, typically referred to as over-the-horizon or beyond-line-of-sight communications. A SATCOM system typically includes one or more satellites orbiting the earth. The satellites direct data and voice traffic between terminals located on earth. Transception of data over SATCOM systems must comply with certain standards and access protocols that are suitable for the type of data to be transmitted. The access protocol determines how channel bandwidth will be allocated among system users.

One widely used satellite channel access communication protocol is Demand Assigned Multiple Access (DAMA). The DAMA technique matches user demands to available satellite capacity. Satellite resources are grouped together as bulk assets, and the DAMA protocol assigns users satellite resources (communication circuits, timeslots, channels, and the like) on a per-request basis matching user information transmission requirements. Once communication is complete, the satellite resources are returned to a pool of available satellite resources for assignment to other users. Since the limited number of satellite resources is used according to need, a DAMA protocol can effectively increase the number of users and provide easier access to the satellite resources for the users. By using DAMA, many users can be served using only a fraction of the satellite resources required by dedicated, point-to-point-single-channel-per-carrier networks, reducing the costs of satellite networking.

Ultra High Frequency (UHF) SATCOM operations provide military users with long-haul data and voice communications capability. In order to enable secure, high capacity communications, and terminal interoperability, standards have been developed to specify the performance characteristics and channel access protocols that user terminals must possess in order to be certified for UHF SATCOM operations. Terminals certified for UHF SATCOM operations must be capable of employing a Demand Assigned Multiple Accesses (DAMA) protocol. In addition, certified terminals must be capable of meeting defined encryption requirements, as well as meeting transmission rates and power requirements. These DAMA certified terminals, which operate in the 5 and 25 kHz bandwidth UHF range, are governed by United States Military Standard (MIL-STD) 188-181, MIL-STD-188-182 and, MIL-STD-188-183. DAMA certified terminals must negotiate for the use of SATCOM resources using the conventional DAMA orderwire, and this negotiation must be done at a data rate of 9600 bits-per-second (bps) using compatible cryptography.

Many SATCOM terminals meet these requirements and are interoperable with the DAMA UHF SATCOM system. Unfortunately, however, some user terminals (referred to herein as "disadvantaged terminals") cannot interoperate with a DAMA UHF SATCOM system because, for example, they do not support compatible cryptography, they do not have sufficient transmit power, and/or they cannot meet the 9600 bps data rate requirements. Some exemplary disadvantaged terminals include handheld combat search and rescue radios, personnel recovery radios, blue force tracking system, sensors, and the like. The primary characteristics that cause a terminal to be a disadvantaged terminal are their small form factor and/or low radio frequency power output which prevents full implementation of MIL-STD-188-181/182/183.

In certain instances it would be highly advantageous for selected disadvantaged terminals to attain over-the-horizon communications through a DAMA-controlled UHF SATCOM system. Such a scenario may be in the search and rescue of a radio user, such as a downed pilot, in hostile territory. However, such a feature should concurrently preserve efficient allocation of the extremely scarce SATCOM resources.

SUMMARY OF THE INVENTION

Accordingly, it is an advantage of the present invention that a method and system are provided for providing service in a satellite communications system to a terminal.

It is another advantage of the present invention that a method and system are provided that enable a terminal, operable in accordance with one communication standard, to communicate through a SATCOM system operating in accordance with a different communication standard.

Another advantage of the present invention is that a method and system are provided that enable a terminal to communicate through a SATCOM system operating in accordance with a different communication standard without compromising the channel allocation efficiency or security of the SATCOM system.

The above and other advantages of the present invention are carried out in one form by a method for providing service in a satellite communications (SATCOM) system to a terminal, the SATCOM system operating in accordance with a first standard, and the terminal being unable to communicate in accordance with the first standard. The method calls for receiving, at a SATCOM resource controller, a request for a satellite resource from a base station and allocating, at the SATCOM resource controller, the satellite resource to the base station. A message is sent to the base station with the allocated satellite resource, a second standard is applied to the allocated satellite resource at the base station. The base station enables the terminal to perform satellite communications in accordance with the second standard using the satellite resource.

The above and other advantages of the present invention are carried out in another form by a base station for providing service in a satellite communications (SATCOM) system to a terminal, the SATCOM system being operated in accordance with a first standard, and the terminal being unable to communicate in accordance with the first standard. The base station includes a gateway operable in compliance with the first standard for communication with a SATCOM resource controller. The gateway is configured to receive a message via a gateway channel from the SATCOM resource controller that includes an assigned satellite resource. A channel controller is in communication with the gateway for receiving the assigned satellite resource from the gateway, applying a second standard to the satellite resource, and enabling the terminal to perform satellite communications in accordance with the second standard using the satellite resource.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

The methodology and system of the present invention provides service within a satellite communications (SATCOM) system to a terminal. The SATCOM system operates in accordance with a first communication standard, and the terminal is unable to communicate in accordance with the first standard. For clarity, the terminal is referred to herein as a "disadvantaged terminal" to emphasize its incompatibility with the communication standard governing the SATCOM system. In an exemplary embodiment, communication over narrowband Ultra High Frequency (UHF) satellite channels via the SATCOM system is governed by United States Military Standards (MIL-STD)-188-181, MIL-STD-188-182, and/or MIL-STD-188-183, and the disadvantaged terminal is incompliant with those standards. However, it should be understood that the present invention may be adapted for use in connection with a number of communications systems governed by their respective communication standards to extend service to a user terminal whose communication capability is incompatible with that particular communication standard.

Figure 1:
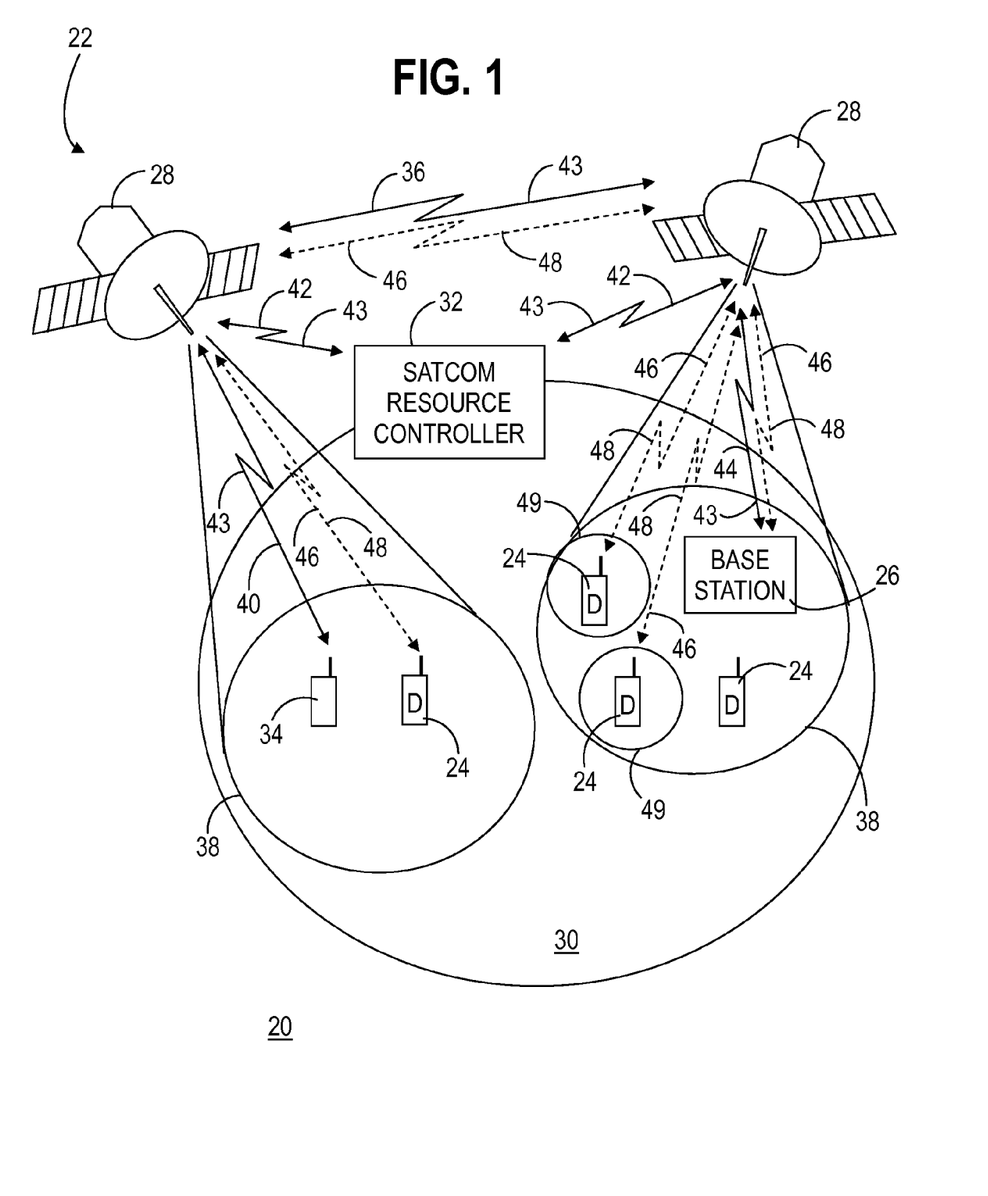
FIG. 1 shows a highly simplified diagram of a portion of a satellite communications (SATCOM) system in which the present invention may be implemented.

FIG. 1 shows a highly simplified diagram of a portion of a communication system 20 in which the present invention may be implemented. Communication system generally includes a satellite communications (SATCOM) system 22 the operability of which is governed by a first communication standard, a secondary network of interoperable terminals 24 whose operability is governed by a second communication standard, and a base station 26 that serves as an intermediary between SATCOM system 22 and terminals 24.

SATCOM system 22 includes at least one satellite 28. While the present invention can be employed in which a large number of satellites are being used in a constellation, it is also applicable with as few as a single satellite. For ease of illustration, FIG. 1 shows only two satellites 28.

A "satellite" is defined herein to refer to a man-made object or vehicle intended to orbit a celestial body, such as earth 30, and includes both geostationary orbit (GEO) and orbiting satellites, and/or combinations thereof, including, for example, low earth orbit (LEO) satellites, medium earth orbit (MEO) satellites, high earth orbit (HEO), and other non-geostationary earth orbit satellites. A "constellation" is defined herein to refer to an ensemble of satellites arranged in orbits for providing specified coverage (i.e., radio communication) of portion(s) or all of earth 30. Satellite orbits may comprise any configuration, including for example, circular or elliptical, and may be polar or inclined.

SATCOM system 22 also includes a SATCOM resource controller 32 and at least one user terminal 34. Per convention, satellites 28, SATCOM resource controller 32, and user terminals 34 may be in communication with one another through communication links or with other communication devices dispersed through earth 30 through public switched telephone networks (PSTNs) and/or through other terrestrial communication capabilities.

Satellites 28 may communicate with each other and/or with other nearby satellites (not shown) through inter-satellite links 36. In addition, communications are routed from satellite 28 down to user terminal 34 within its footprint 38 using a communication link 40. The assignment of satellite resources (timeslots, frequency channels, and the like) may be performed at SATCOM resource controller 32. Thus, SATCOM resource controller 32 may communicate via satellites 28 using communication links 42 in order to receive requests for service and to transmit response messages that include an assignment of satellite resources, i.e., channels. Thus, a communication from user terminal 34 located at any point on or near the surface of earth 30 within footprint 38 of at least one of satellites 28 may be routed through satellites 28 to within range of substantially any other point on the surface of earth 30.

SATCOM system 22 may be an ultra high frequency (UHF) SATCOM system used for military purposes. Therefore, communication within UHF SATCOM system 22 over links 36, 40, and 42 is handled through a Demand Assigned Multiple Access (DAMA) protocol, sometimes referred to as a DAMA waveform. Operability within UHF SATCOM system 22 using a DAMA protocol is governed by a pre-defined communication standard, for example, MIL-STD-188-182 for 5-kHz bandwidth channels and/or MIL-STD-188-183 for 25-kHz bandwidth channels. Hereinafter, the communication standard governing communications within UHF SATCOM system 22 will be referred to as a first standard 43, and is shown in conjunction with each of links 36, 40, and 42 to represent satellite communications in accordance with first standard 43.

Terminals 24 cannot directly interoperate within UHF SATCOM system 22 because their characteristics do not allow full implementation of first standard 43. For example, terminals 24 may not support compatible cryptography, may not utilize the same modulation, may not have sufficient transmit power, and/or may not meet the 9600 bps data rate requirements. Terminals 24 are referred to hereinafter as "disadvantaged terminals 24" to distinguish them from terminals 34 that operate in compliance with the predefined first standard 43 of UHF SATCOM system 22. The primary characteristics that cause terminals 24 to be a "disadvantaged" are their small form factor and/or low radio frequency power output which prevents full implementation of first standard 43.

Disadvantaged terminals 24 may, however, be interoperable with one another utilizing a different communication protocol or waveform specified by the different, or second, communication standard. This "second communication standard" specifies, among other performance characteristics, encryption requirements, modulation, transmit power, data rate, and so forth for disadvantaged terminals 24. Disadvantaged terminals 24 may be utilized in personnel recovery schemes, monitoring, location reporting, and the like. Some exemplary disadvantaged terminals 24 include handheld combat search and rescue radios, personnel recovery radios, blue force tracking system, sensors, and so forth.

Base station 26 serves as an intermediary between disadvantaged terminals 24 and SATCOM system 22 in order to provide communication service to disadvantaged terminals 24 within UHF SATCOM system 22. That is, base station 26 provides a mechanism to allow disadvantaged terminals 24 access to DAMA-controlled SATCOM system 22 satellite resources. As used herein, the term "satellite resource" refers to a frequency channel and/or timeslot(s) managed in accordance with the DAMA waveform protocol specified by first standard 43.

Thus, base station 26 is DAMA SATCOM certified and can directly interoperate within UHF SATCOM system 22, as represented by a communication link 44. Each of communication links 36, 40, 42, and 44 are represented by solid-line bi-directional arrows. These links 36, 40, 42, and 44 are established utilizing the pre-defined DAMA communication waveform protocol. That is, communication links 36, 40, 42, and 44 are established and managed in accordance with first standard 43 of SATCOM system 22, e.g., MIL-STD-188-181/182/183 standards.

Satellite resource 46 can be allocated for use by disadvantaged terminals 24 in accordance with the present invention. Satellite resource 46 is represented by dashed-line bi-directional arrows in FIG. 1. Satellite resource 46 is a subset of the satellite resources, i.e., frequency channels and/or timeslot(s), managed by SATCOM resource controller 32, and is established through the intercession of base station 26. However, unlike communication links 36, 40, 42, and 44, satellite resource 46 is not established and managed in accordance with first standard 43 of SATCOM system 22. Rather, as discussed in detail below, satellite resource 46 is established and managed in accordance with a second communication standard governing communications to and from disadvantaged terminals 24. This second communication standard will be referred to as a second standard 48 and is shown in conjunction with satellite resource 46 to represent satellite communications in accordance with second standard 48.

Through the use of satellite resource 46, disadvantaged terminals 24 can communicate via satellites 28 of UHF SATCOM system 22 with other disadvantaged terminals 24 within different cells 49 in footprint 38 of one satellite 28, with other disadvantaged terminals residing in footprint 38 of different satellites, with DAMA-compliant user terminals 34, and/or with other communication devices dispersed throughout earth 30 through conventional terrestrial communication devices. Moreover, as will be discussed below, this communication can be achieved without adversely impacting current operability standards for UHF SATCOM system 22, without the encryption requirements specified for UHF SATCOM system 22, and while allowing lower data rates for operation of disadvantaged terminals 24 then that specified for UHF SATCOM system 22.

Figure 2:
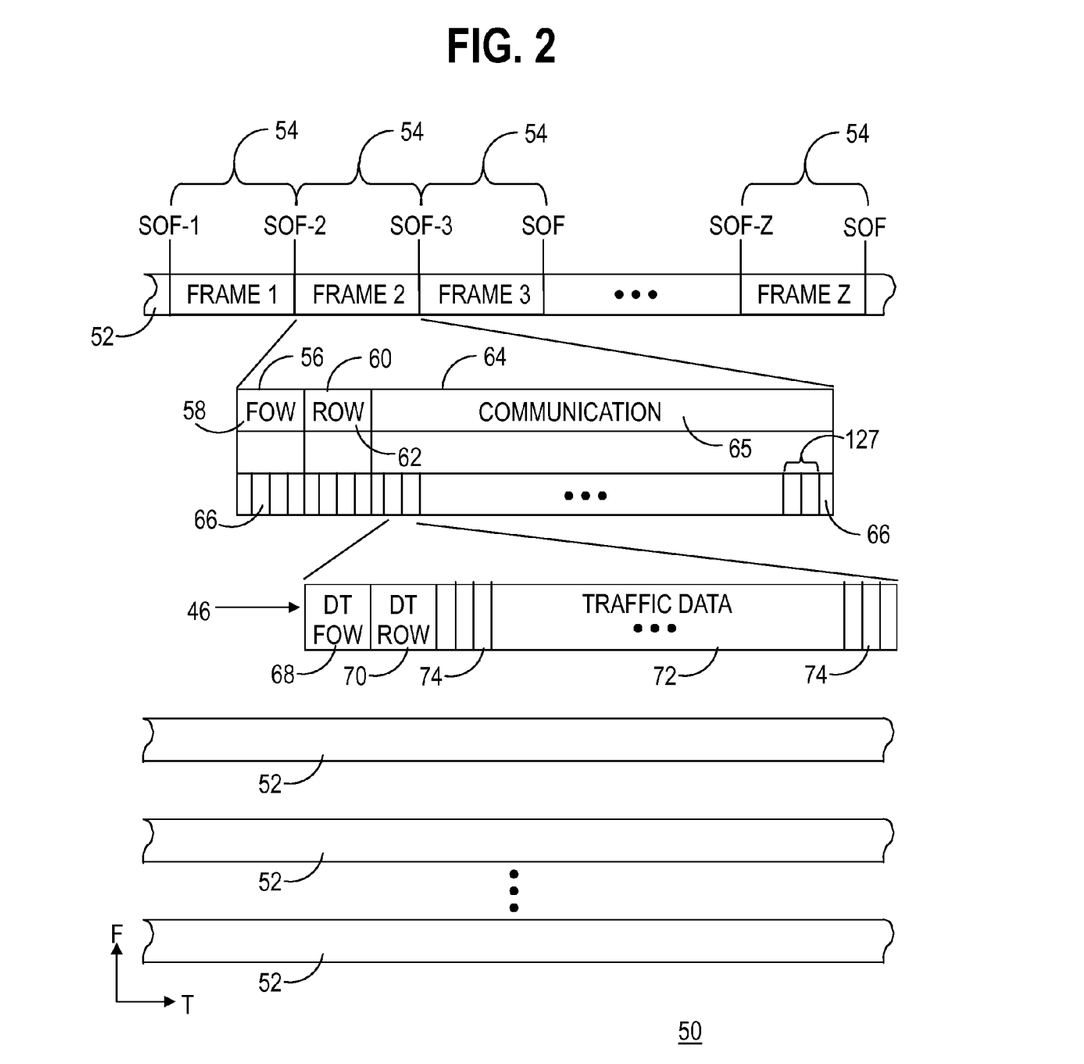
FIG. 2 shows an exemplary frequency-time graph of satellite resources assignable in accordance with a Demand Assigned Multiple Access protocol.

FIG. 2 shows an exemplary frequency-time graph 50 of satellite resources assignable in accordance with a Demand Assigned Multiple Access (DAMA) protocol, or waveform, utilized within UHF SATCOM system 22 in accordance with first standard 43 (FIG. 1) governing communication within UHF SATCOM system 22.

The DAMA protocol uses multiple frequency channels 52 which may be utilized for control, data, and voice transmission in accordance with known methodologies. Each of channels 52 may be divided into fixed intervals in time, known as frames 54. In the highly simplified structure shown, each of frames 54 is further divided into segments, for example, a first segment 56 for transmission of a forward orderwire (FOW) 58, a second segment 60 for transmission of a return orderwire (ROW) 62, and a traffic segment 64 for data and/or voice communication 65. Each of segments 56, 60, and 64 may be divided into a plurality of timeslots 66, each of which accommodates a single burst of information. Data transmission occurs in each of the time-sequential frames 54 on channels 52.

Within UHF SATCOM system 22 (FIG. 1), a network of DAMA-compliant nodes includes user terminals 34, base station 26 (FIG. 1), satellites 28, and SATCOM resource controller 32. These DAMA-compliant nodes perform two types of processing in accordance with DAMA, including a waveform processing function and an orderwire processing function. The waveform processing function includes signal processing and time division multiple access (TDMA) time processing operations that enable the DAMA-compliant nodes to properly access channels 52.

Signal processing entails data manipulation and signal shaping tasks in order to successfully transmit and/or receive within channels 52 over satellites 28 (FIG. 1). TDMA time processing enables the DAMA-compliant nodes to access channels 52 at the proper time. TDMA time processing works on the basis of SATCOM resource controller 32 (FIG. 1) transmitting FOW 58 in timeslots 66 of first segment 56 which all other DAMA-compliant nodes receive in order to synchronize themselves. Initiation of the transmission of first segment 56 indicates the "start-of-frame" (SOF) to enable frame synchronization at every frame 54 so that the present users remain synchronized and to allow new users to enter UHF SATCOM system 22.

Orderwire processing entails performing command and control protocol functions to request, allocate, and access the satellite resources, i.e., timeslots 66 of channels 52. There are two types of orderwire messages used in UHF SATCOM system 22, FOW 58 and ROW 62. FOW 58 is created and transmitted by SATCOM resource controller 32 (FIG. 1) and is received and interpreted by terminal 34 and base station 26. FOW 58 contains information that controls channel 52 and maintains network discipline. This includes acknowledgements to user call requests, frame structure information, and commands that inform DAMA-compliant nodes, e.g., terminals 34 and base station 26, what timeslots 66 to access for baseband communications. ROW 62 is created and transmitted by DAMA-compliant nodes, e.g., terminals 34 and base station 26, and is received and interpreted by SATCOM resource controller 32. ROW 62 provides terminals 34 and base station 26 with the capability to communicate their call request and status information to SATCOM resource controller 32.

Per convention, each DAMA-compliant node, e.g., terminals 34 and base station 26, is assigned its own identifier. These identifiers are included as data in every orderwire message, both FOW 58 and ROW 62, that requires the identity of the message originator or message destination. This enables users to generate point-to-point call requests based on their own identifier and the identifier of the party with whom they wish to perform baseband communications.

In accordance with the present invention, base station 26 can request satellite resource 46, i.e., a subset of timeslots 66, for enabling disadvantaged terminals 24 (FIG. 1) to perform satellite communications in accordance with their respective second standard 48 (FIG. 1). Base station 26 makes those requests and SATCOM resource controller 32 grants those requests using the orderwire processing, i.e., exchange of FOW 58 and ROW 62, within one of channels 52.

Upon the allocation of one or more timeslots 66, base station 26 establishes the waveform format and timing specified by second standard 48 within those allocated timeslots 66. Base station 26 then grants satellite resource 46 to disadvantaged terminals 24 within those timeslots 66 for satellite communications. Satellite resource 46 is discussed herein as being in the form of timeslots 66. However, it should be understood that the present invention may be adapted to incorporate other existing and upcoming communication channel access protocols. For example, satellite resource 46 may be a code division in accordance with a Code Division Multiple Access (CDMA) channel access protocol within one of channels 52 of DAMA SATCOM system 22.

As further shown in FIG. 2, satellite resource 46 in the form of timeslots 66 of one of channels 52 is allocated to base station 26. Satellite resource 46 may include multiple segments for transmission of a disadvantaged terminal forward orderwire (DT FOW) message 68, a disadvantaged terminal return orderwire (DT ROW) message 70, and disadvantaged terminal traffic data 72.

Each of the segments within satellite resource 46 may be subdivided into a plurality of timeslots 74 in accordance with a burst rate, transmission power, and/or waveform protocol specified by second standard 48 governing communication to and from disadvantaged terminals 24. In such a manner, timeslots 66 can be utilized as satellite resource 46 for disadvantaged terminals 24. However, disadvantaged terminals 24 can operate in accordance with pre-defined performance characteristics of terminals 24, i.e., second standard 48, within UHF SATCOM system 22 governed by a first standard 43. Satellite resource 46 is secured for use by disadvantaged terminal 24 until transmission is complete, at which time satellite resource 46 can be returned to a pool of available satellite resources for assignment to other users.

Figure 3:
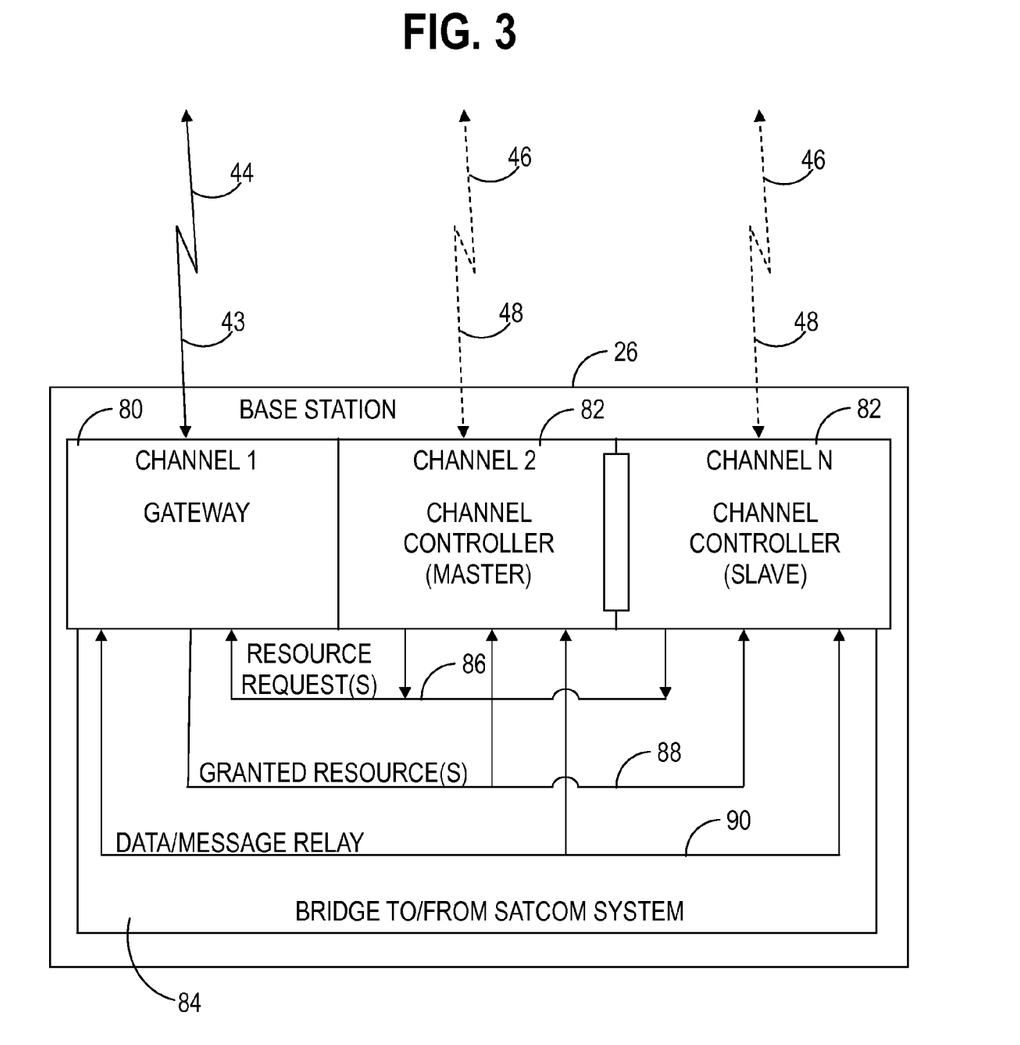
FIG. 3 shows a block diagram of a base station in accordance with the present invention.

FIG. 3 shows a block diagram of base station 26 in accordance with the present invention. Base station 26 may be located anywhere within footprint 38 (FIG. 1) of one of satellites 28 (FIG. 1). Base station 26 serves as a network control terminal for the secondary network of disadvantaged terminals 24 and acts as a relay terminal for communications between disadvantaged terminals 24, and between disadvantaged terminals and user terminals 34.

In one embodiment, base station 26 is a multiple channel terminal that includes a gateway 80 and one or more channel controllers 82 in communication with gateway 80 via bridge architecture 84. In general, gateway 80 gains access to one or more timeslots 66 (FIG. 2) using standard orderwire encrypted FOW 58 (FIG. 2) and ROW 62 (FIG. 2). Channel controller 82 then establishes a surrogate orderwire, i.e., DT FOW 68 (FIG. 2) on the assigned timeslot 66. DT FOW 68 is transmitted at an appropriate radio frequency burst rate for establishing links with disadvantaged terminals 24 (FIG. 1). In general, DT FOW 68 includes channel control information governed by second standard 48 that is transmitted to disadvantaged terminal 24 at a burst rate that differs from the burst rate governed by said first standard 43. For example, the data burst rate specified by first standard 43 may be 9600 bps, whereas a data burst rate specified by second standard 48 may be lower.

Two channel controllers 82, one labeled "Master" and the other labeled "Slave," are shown in FIG. 3. Multiple channel controllers 82 can be employed within base station 26 to allow for capacity expansion as the number of disadvantaged terminals 24 increases. Discussion is directed to a single channel controller 82 for simplicity of illustration. However, it should be appreciated that each of channel controllers 82 may be associated with identifiers and/or channel identifiers that can be utilized to distinguish each of channel controllers 82 to enable the appropriate routing and relay of messaging.

Gateway 80 is operable in compliance with first standard 43 for communication with SATCOM resource controller 32 (FIG. 1) via link 44 to SATCOM system 22 (FIG. 1). Link 44 is referred to hereinafter as a gateway channel 44 to denote communication within SATCOM system 22 in accordance with first standard 43.

Gateway 80 is configured to receive resource request messaging 86 from channel controller 82 via bridge architecture 84. Resource request messaging 86 can include a request for satellite resource 46 forwarded from disadvantaged terminal 24 through channel controller 82. Gateway 80 monitors for and detects FOW 58 via gateway channel 44 and makes a request for satellite resource 46 using ROW 62. Gateway 80 then communicates resource granted messaging 88 specifying satellite resource 46 to channel controller 82 via bridge architecture 84.

In response, channel controller 82 establishes the waveform and timing of second standard 48 within the granted satellite resource 46. Channel controller 82 grants satellite resource 46 to particular disadvantaged terminals 24 using DT FOW 68 (FIG. 2) and monitors for DT ROW 70 (FIG. 2) from disadvantaged terminals 24.

Bridge architecture 84 further interconnects gateway 80 and channel controller 82 via a pipeline 90 in order to enable the relay of messaging and data between disadvantaged terminals 24 and UHF SATCOM system 22 (FIG. 1). Gateway 80 may perform processing, such as synchronization, translation, decryption and encryption activities to enable the communication of messaging and data from satellite resource 46 governed in accordance with second standard 48 over another satellite resource, i.e., frequency channel 52 and timeslot(s) 66, governed in accordance with first standard 43.

Although base station 26 is discussed and shown herein as a multiple channel terminal, it should be understood that various alternative embodiments may be envisioned. For example, base station 26 may be a single channel terminal that can multiplex its operation between controller and gateway functions to provide satellite communications capability to disadvantaged terminals 24, albeit at a reduced performance level.

Figure 4:
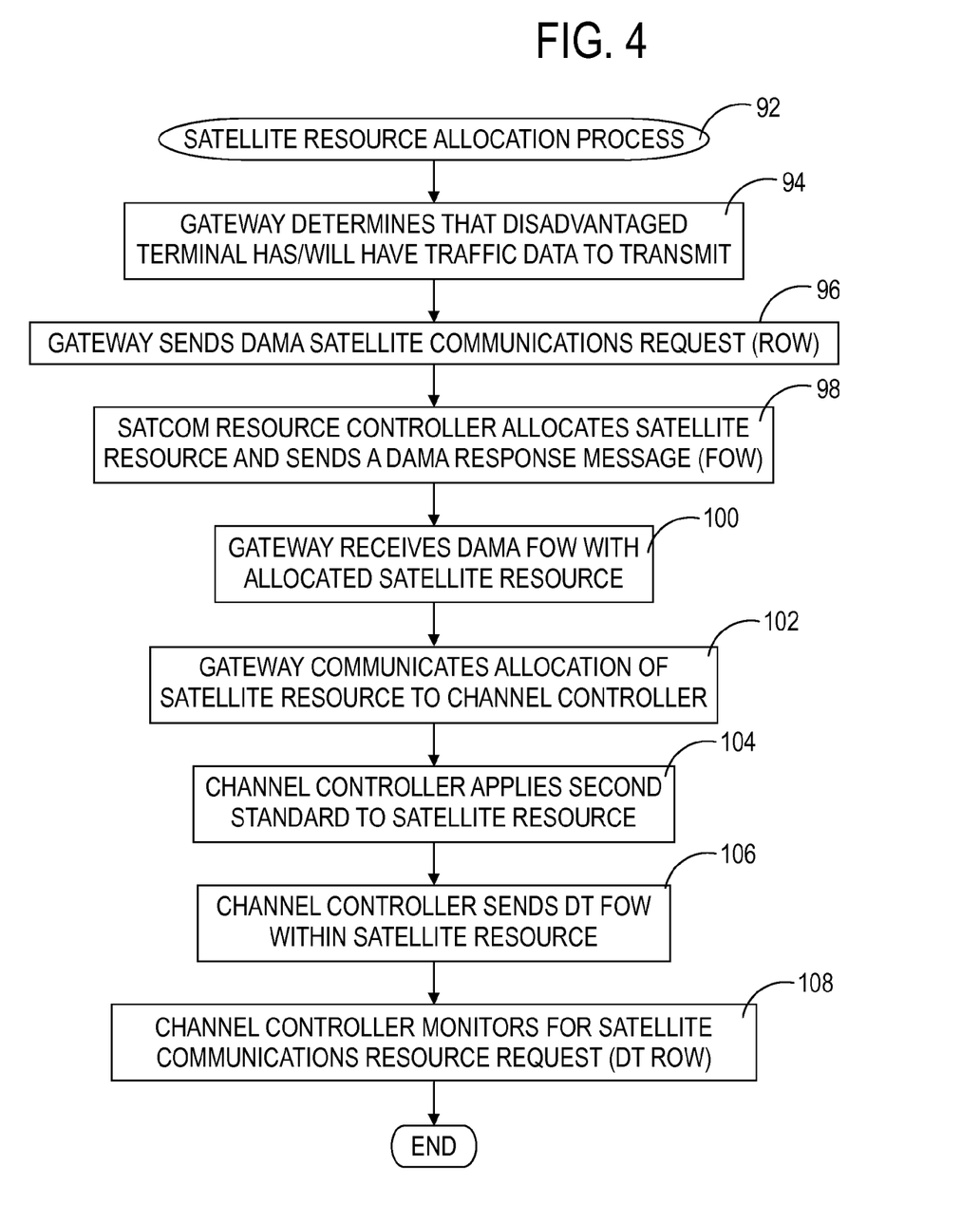
FIG. 4 shows a flowchart of a satellite resource allocation process, according to an embodiment of the present invention.

FIG. 4 shows a flowchart of satellite resource allocation process 92, according to an embodiment of the present invention. Satellite resource allocation process 92 is performed to allocate or reserve satellite resource 46 (FIG. 2), i.e. one or more timeslots 66 (FIG. 2) within one of frequency channels 52 operable within SATCOM system 22 (FIG. 1), for providing service within SATCOM system 22 to disadvantaged terminal 24 (FIG. 1).

Figure 5:
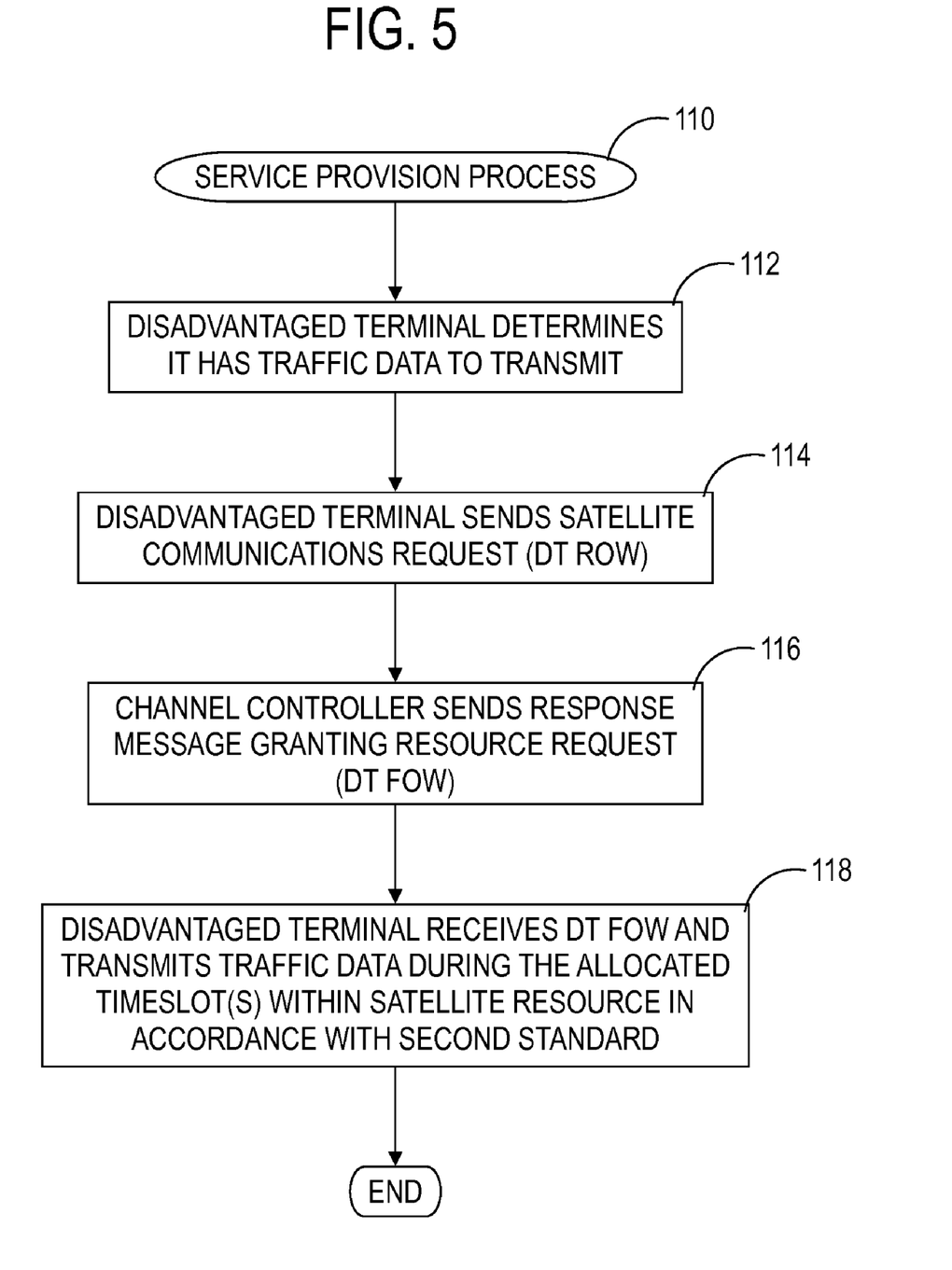
FIG. 5 shows a flowchart of a satellite communication service provision process, according to an embodiment of the present invention.
Figure 6:
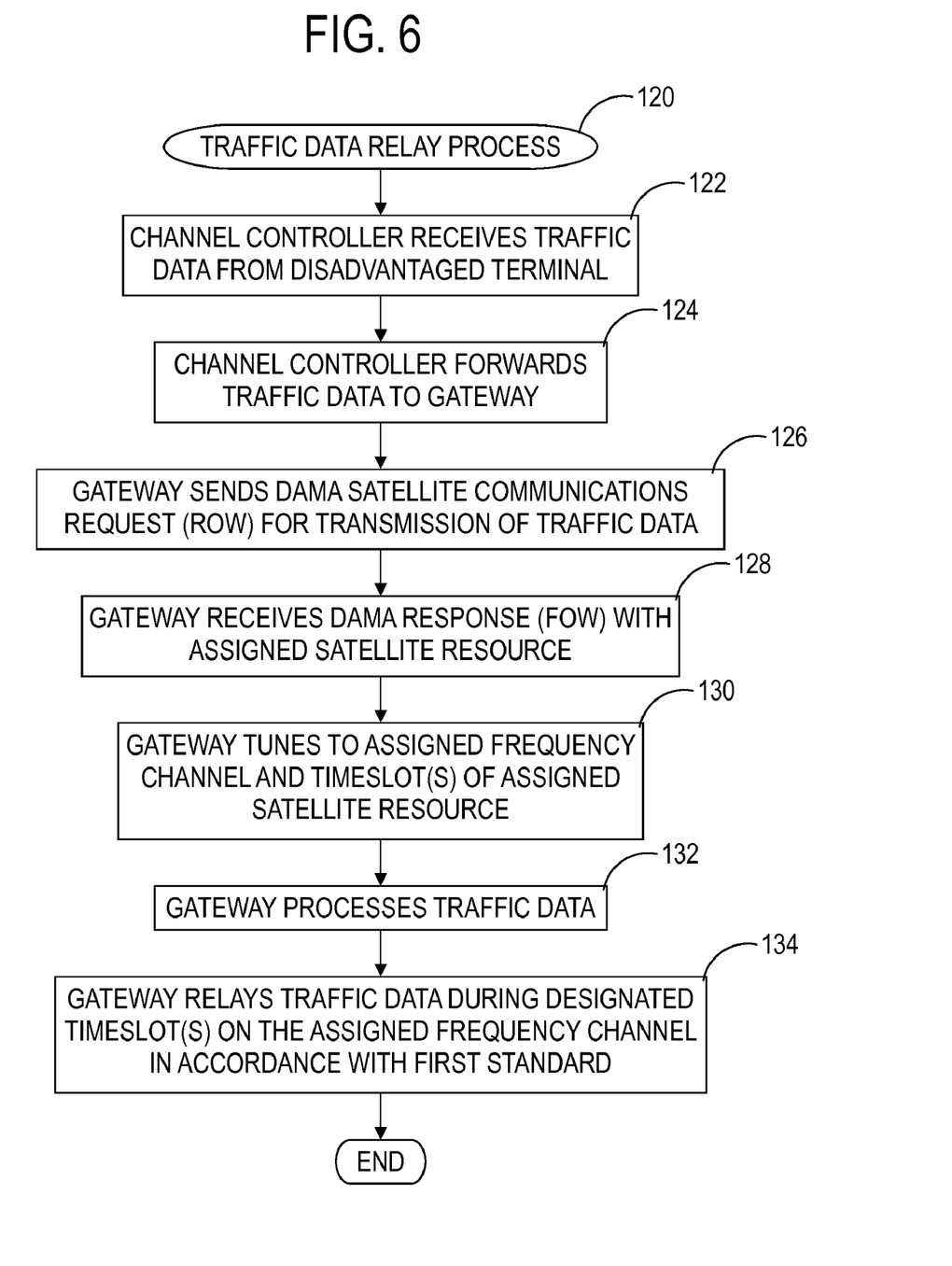
FIG. 6 shows a flowchart of a data relay process, according to an embodiment of the present invention.

The methodology of FIGS. 4-6 will be discussed in terms of providing service to a singular one of disadvantaged terminals 24 for simplicity of illustration. However, the following discussion can be readily expanded to encompass provision of service to multiple disadvantaged terminals 24 through the allocation of additional satellite resources 46 and/or through the subdivision of satellite resource 46 into multiple timeslots 74 (FIG. 2) of satellite resource 46. Furthermore, the methodology of FIGS. 4-6 is discussed in terms of traffic data originating at disadvantaged terminal 24 for transmission elsewhere. It should be understood that the following methodology can be readily expanded to include situations in which traffic data originating elsewhere is to be received by disadvantaged terminal 24.

Process 92 begins with a task 94. At task 94, gateway 80 (FIG. 3) at base station 26 (FIG. 3) determines that disadvantaged terminal 24 has or will have traffic data 72 (FIG. 2) to transmit. The term "traffic data" used herein can refer to data, voice, or a combination of data and voice. In one embodiment, gateway 80 may anticipate the need for communication with disadvantaged terminal 24 in response to the deployment of disadvantaged terminal 24 within footprint 38 (FIG. 1), time of day, a particular mission utilizing disadvantaged terminals 24, and the like. In another embodiment, base station 26 may be transmitting DT FOW 68 (FIG. 2) and monitoring for DT ROW 70 (FIG. 2) via a previously allocated satellite resource in accordance with second standard 48 (FIG. 2). Still other scenarios may be envisioned in which gateway 80 determines a need for satellite resource 46.

In response to task 94, a task 96 is performed. At task 96, gateway 80 sends a DAMA satellite communications request, ROW 62 (FIG. 2), via gateway channel 44 toward SATCOM resource controller 32 (FIG. 1) per the conventional DAMA communication methodology of first standard 43 (FIG. 2). ROW 62 contains a request for service that includes at a minimum an identification of gateway 80 and an identification of the amount of traffic data 72 that needs to be sent or an identification of the amount of capacity (ex., quantity of timeslots 66) desired by gateway 80.

Upon receipt of ROW 62 at SATCOM resource controller 32, a task 98 is performed. At task 98, SATCOM resource controller 32 determines when one of frequency channels 52 will be available with adequate timeslots 66 (FIG. 2) requested by gateway 80. SATCOM resource controller 32 allocates satellite resource 46, i.e., timeslots 66 within one of frequency channels 52, and sends a DAMA response message, FOW 58, to gateway 80.

Next, at a task 100, gateway 80 of base station 26 (FIG. 3) receives the DAMA response message, FOW 58, indicating the allocation of satellite resource 46. It should be emphasized that the exchange of information in tasks 96, 98, and 100 is performed over gateway channel 44 (FIG. 3) in accordance with first standard 43.

Following task 100, a task 102 is performed. At task 102, gateway 80 communicates the allocation of satellite resource 46 to channel controller 82 as resource granted messaging 88 (FIG. 3) within bridge architecture 84 (FIG. 3).

Next, a task 104 is performed by channel controller 82. At task 104, channel controller 82 applies second standard 48 (FIG. 1) to satellite resource 46. By way of example, channel controller establishes the waveform protocol, timing, synchronization, timeslots 74 (FIG. 2), encryption requirements, and the like specified by second standard 48 on satellite resource 46.

Following task 104, a task 106 is performed. At task 106, channel controller 82 sends forward orderwire messaging, DT FOW 68, on satellite resource 46. DT FOW 68 may include synchronization information, information that controls satellite resource 46, such as acknowledgements to requests from disadvantaged terminals 24, satellite resource 46 structure information, commands that inform disadvantaged terminal 24 what timeslots 74 (FIG. 2) to access for communication of traffic data, and the like.

In response to task 106, process control proceeds to a task 108. At task 108, channel controller 80 monitors for a satellite communications resource request, DT ROW 70, from disadvantaged terminal 24. Following task 108, satellite resource allocation process 92 exits with channel controller 82 in a monitoring mode. The outcome of process 92 is the allocation of satellite resource 46 to base station 26. Base station 26 can subsequently provision satellite resource 46 for transmitting traffic data 72 (FIG. 2) to and from disadvantaged terminal 24, as discussed below in connection with FIG. 5.

FIG. 5 shows a flowchart of service provision process 110, according to an embodiment of the present invention. Process 110 is performed to provide service in SATCOM system 22 (FIG. 1) to disadvantaged terminal 24 (FIG. 1), wherein SATCOM system 22 operates in accordance with first standard 43 (FIG. 1) and disadvantaged terminal 24 is unable to communicate in accordance with first standard 43. That is, disadvantaged terminal 24 is incompliant with first standard 43.

Service provision process 110 begins with a task 112. At task 112, disadvantaged terminal 24 determines that it has traffic data 72 (FIG. 2) ready to be transmitted. Again, traffic data 72 may be data, voice, or mixed data and voice.

A task 114 is performed in response to task 112. At task 114, disadvantaged terminal 24 sends a request for satellite communications, DT ROW 70 (FIG. 2), to base station 26 (FIG. 1). That is, when disadvantaged terminal 24 determines that it has traffic data 72 awaiting transmission in task 112, disadvantaged terminal 24 sends DT ROW 70. DT ROW 70 may include identification of the amount of traffic data 72 that needs to be sent and an identification of disadvantaged terminal 24.

When channel controller 82 (FIG. 3) of base station 26 receives DT ROW 70, a task 116 is performed. At task 116, channel controller 82 determines the available capacity, for example, timeslots 74, within satellite resource 46 and sends a response message, DT FOW 68, granting the request for satellite resource 46.

Service provision process 110 continues with a task 118 in response to task 116. At task 118, disadvantaged terminal 24 receives DT FOW 68 and transmits traffic data 72 during the allocated timeslot(s) 74 (FIG. 2) within satellite resource 46 in accordance with second standard 48 (FIG. 1). Transmission of traffic data 72 can continue within the allocated timeslot(s) 74 until transmission is complete, at which time timeslot(s) 74 can be released and reallocated by base station 26 for the transmission of traffic data 72 from another disadvantaged terminal 24. Alternatively, satellite resource 46 can be released by base station 26 and returned to the available pool of satellite resources managed by SATCOM resource controller 32 (FIG. 1). Following task 118, service provision process 110 exits. Thus, disadvantaged terminal 24 is able to take advantage of the satellite communications capability provided by SATCOM system 22 (FIG. 1) using reduced security requirements, a slower burst rate transmission link, and a different waveform protocol specified by second standard 48 in lieu of first standard 43 governing communication within SATCOM system 22.

FIG. 6 shows a flowchart of a data relay process 120, according to an embodiment of the present invention. In general, traffic data 72 (FIG. 2) may be transmitted to or from disadvantaged terminal via satellite 28 (FIG. 1) to a desired destination. That desired destination may be to another disadvantaged terminal 24 or to a DAMA-compliant node, such as terminal 34 (FIG. 1). In some instances, traffic data 72 may be routed through gateway 80 (FIG. 3) so that it may be processed prior to its further transmission.

Data relay process 120 begins with a task 122. At task 122, channel controller 82 (FIG. 3) receives traffic data 72 (FIG. 2) from disadvantaged terminal 24.

Next, at a task 124, channel controller 82 forwards traffic data 72 to gateway 80 (FIG. 3) via pipeline 90 (FIG. 3) of bridge architecture 84 (FIG. 3) for its receipt at gateway 80.

In response to the receipt of traffic data 72 at task 124, a task 126 is performed. At task 126, gateway 80 sends a DAMA satellite communications request, ROW 62 (FIG. 2) to SATCOM resource controller 32 (FIG. 1) for the transmission of traffic data 72. SATCOM resource controller receives ROW 62 and assigns a satellite resource, i.e., timeslot(s) 66 on one of frequency channels 52 returns FOW 58 specifying the satellite resource. By way of example, a second satellite resource 127 (see FIG. 2) may be assigned for the transmission of traffic data 72 from gateway 80.

Next, at a task 128, gateway 80 receives FOW 58 specifying the assignment of second satellite resource 127.

A task 130 is performed in connection with task 128. At task 130, gateway 80 tunes to second satellite resource 127, i.e., the assigned one of frequency channels 52 and timeslots 66.

Next, at a task 132, gateway 80 processes traffic data 72 in accordance with second satellite resource 127. Processing can include a number of activities, such as, synchronization, translation, decryption and encryption activities that enable the communication of traffic data 72 from satellite resource 46, formerly governed in accordance with second standard 48, over second satellite resource 127, now governed in accordance with first standard 43.

Following task 132, gateway 80 relays traffic data 72 during the designated timeslot(s) 66 on the assigned one of frequency channels 52 of second satellite resource 127 in accordance with first standard 43. Transmission of traffic data 72 can continue within second satellite resource 127 until transmission is complete, at which time second satellite resource 127 can be released and reallocated by SATCOM resource controller 32 (FIG. 1) for the transmission of data and/or voice communication 65 from terminals 34 and/or base station 26.

In summary, the present invention teaches of a base station that serves as an intermediary between a SATCOM system, in which communication is governed by a first standard, and a disadvantaged terminal, whose operation is incompliant with the first standard. The present invention further teaches of methodology for providing service in the SATCOM system to the disadvantaged terminal by requesting and allocating a satellite resource from the pool of satellite resources utilized within the SATCOM system. A second communication standard is applied to the allocated satellite resource, and the disadvantaged terminal is enabled to perform satellite communications in accordance with the second standard using the satellite resource. Thus, satellite communications are allowed to a terminal that would otherwise be unable to access the satellite resources, and at the same time the efficient allocation of scarce satellite resources is preserved. The features of the present invention can be readily implemented on current Demand Assigned Multiple Access (DAMA) channels without impacting current DAMA operability. In addition, the disadvantaged terminals need not employ the DAMA orderwire encryption requirements. Furthermore, disadvantaged terminals can transmit and receive traffic data a lower burst rates, relative to UHF SATCOM.

Although the preferred embodiments of the invention have been illustrated and described in detail, it will be readily apparent to those skilled in the art that various modifications may be made therein without departing from the spirit of the invention or from the scope of the appended claims. For example, the process steps discussed herein can take on great number of variations and can be performed in a differing order than that which was presented.

What is claimed is:

1. A method for providing service in a satellite communications (SATCOM) system to a terminal, said SATCOM system operating in accordance with a first standard, said terminal being unable to communicate in accordance with said first standard, and said method comprising:
receiving, at a SATCOM resource controller, a request for a satellite resource from a base station;
allocating, at said SATCOM resource controller, said satellite resource to said base station;
sending said base station a message with said allocated satellite resource;
applying, at said base station, a second standard to said satellite resource; and
enabling said terminal to perform satellite communications in accordance with said second standard using said satellite resource.

2. A method as claimed in claim 1 wherein said applying operation comprises establishing a waveform format and timing defined by said second standard within said satellite resource.

3. A method as claimed in claim 1 further comprising:
detecting, at said terminal, said satellite resource governed by said second standard;
requesting, by said terminal, said satellite resource; and
granting, at said base station, said satellite resource for use by said terminal to perform said satellite communications.

4. A method as claimed in claim 1 further comprising transmitting, from said base station via said satellite resource, channel control information governed by said second standard to said terminal at a second burst rate that differs from a first burst rate governed by said first standard.

5. A method as claimed in claim 1 further comprising transmitting, from said base station via said satellite resource, channel control information governed by said second standard to said terminal with a second modulation that differs from a first modulation governed by said first standard.

6. A method as claimed in claim 1 wherein said enabling operation comprises communicating data from said terminal to a second terminal using said satellite resource in accordance with said second standard.

7. A method as claimed in claim 1 wherein said enabling operation comprises:
communicating data from said terminal to said base station using said satellite resource in accordance with said second standard; and
relaying said data from said base station toward a second terminal using a second satellite resource governed by said first standard.

8. A method as claimed in claim 7 further comprising prior to said relaying operation processing, at said base station, said data communicated in accordance with said second standard for communication via said SATCOM system in accordance with said first standard.

9. A method as claimed in claim 1 wherein said SATCOM system is a Demand Assigned Multiple Access (DAMA) SATCOM system, said first standard defines requirements for interoperation with said DAMA SATCOM system, and said terminal is incompliant with said first standard.

10. A method as claimed in claim 9 wherein said satellite resource is a timeslot within a channel of said DAMA SATCOM system.

11. A method as claimed in claim 9 wherein said satellite resource is a code division within a channel of said DAMA SATCOM system.

12. A base station for providing service in a satellite communications (SATCOM) system to a terminal, said SATCOM system being operated in accordance with a first standard, said terminal being unable to communicate in accordance with said first standard, and said base station comprising:
a gateway operable in compliance with said first standard for communication with a SATCOM resource controller, said gateway being configured to receive a message via a gateway channel from said SATCOM resource controller that includes an allocated satellite resource; and
a channel controller in communication with said gateway for receiving said allocated satellite resource from said gateway, applying a second standard to said satellite resource, and enabling said terminal to perform satellite communications in accordance with said second standard using said satellite resource.

13. A base station as claimed in claim 12 wherein said SATCOM system is a Demand Assigned Multiple Access (DAMA) SATCOM system, and said gateway is a DAMA compliant terminal.

14. A base station as claimed in claim 13 wherein said first standard defines requirements for interoperation with said DAMA SATCOM system, and said terminal is incompliant with said first standard.

15. A base station as claimed in claim 13 wherein said satellite resource is a timeslot within a channel of said DAMA SATCOM system, and said channel controller controls access of said terminal to said timeslot.

16. A base station as claimed in claim 12 wherein said channel controller grants said satellite resource for communication of data between said terminal and a second terminal in accordance with said second standard.

17. A base station as claimed in claim 12 wherein:
said channel controller receives data from said terminal using said satellite resource in accordance with said second standard, said channel controller communicates said data to said gateway; and
said gateway includes means for processing said data for communication via said SATCOM system and relaying said data from said base station toward a second terminal using a second satellite resource governed by said first standard.

18. A communication system as claimed in claim 17 wherein said channel controller grants said satellite resource for communication of data between a pair of said terminals in accordance with said second standard.

19. A communication system as claimed in claim 17 wherein:
said channel controller receives data from said one of said terminals using said satellite resource in accordance with said second standard, said channel controller communicates said data to said gateway; and
said gateway includes means for processing said data for communication via said SATCOM system and relaying said data from said base station toward a DAMA-compliant terminal using a second satellite resource governed by said first standard.

20. A communication system comprising:
a Demand Assigned Multiple Access (DAMA) satellite communications (SATCOM) system governed by a first standard, said DAMA SATCOM system including a SATCOM resource controller, said SATCOM resource controller allocating satellite resources in response to user requests;
a secondary network of interoperable terminals, said interoperable terminals being unable to communicate in accordance with said first standard; and
a base station for providing service in a satellite communications (SATCOM) system to said terminals, said base station including:
a gateway operable in compliance with said first standard, said gateway receiving a message via a gateway channel from said SATCOM resource controller that includes an allocated one of said satellite resources; and
a channel controller in communication with said gateway for receiving said allocated satellite resource from said gateway, applying a second standard to said satellite resource, and enabling at least one of said terminals to perform satellite communications in accordance with said second standard using said satellite resource.

* * * * *